US 011585689B2

(12) United States Patent
Vianello et al.

(10) Patent No.: US 11,585,689 B2
(45) Date of Patent: Feb. 21, 2023

(54) GAS METER STRUCTURE WITH FILTERING ARRANGEMENT INCLUDING A DUST DEPOSIT CHAMBER

(71) Applicant: PIETRO FIORENTINI S.P.A., Arcugnano (IT)

(72) Inventors: Mario Vianello, Garbagna Novarese (IT); Marcello Ghidina, Vigevano (IT); Claudio Imboccioli, Creazzo (IT)

(73) Assignee: Pietro Fiorentini S.P.A., Arcugnano (IT)

( * ) Notice: Subject to any disclaimer, the term of this patent is extended or adjusted under 35 U.S.C. 154(b) by 335 days.

(21) Appl. No.: 16/972,342

(22) PCT Filed: Jun. 18, 2019

(86) PCT No.: PCT/IB2019/055083
§ 371 (c)(1),
(2) Date: Dec. 4, 2020

(87) PCT Pub. No.: WO2019/244022
PCT Pub. Date: Dec. 26, 2019

(65) Prior Publication Data
US 2021/0231481 A1     Jul. 29, 2021

(30) Foreign Application Priority Data
Jun. 18, 2018   (IT) .......................... 102018000006413

(51) Int. Cl.
*G01F 15/12*          (2006.01)
(52) U.S. Cl.
CPC .................................. *G01F 15/125* (2013.01)

(58) Field of Classification Search
None
See application file for complete search history.

(56) References Cited

U.S. PATENT DOCUMENTS

| 5,220,830 A | 6/1993 | Boone |
| 2012/0118407 A1 | 5/2012 | Sonnenberg et al. |

FOREIGN PATENT DOCUMENTS

| EP | 0 713 078 A1 | 5/1996 |
| EP | 1 128 167 A1 | 8/2001 |

(Continued)

OTHER PUBLICATIONS

International Search Report and Written Opinion dated Sep. 26, 2019, issued in PCT Application No. PCT/IB2019/055083, filed Jun. 18, 2019.

*Primary Examiner* — Harshad R Patel
(74) *Attorney, Agent, or Firm* — Workman Nydegger

(57) ABSTRACT

A gas meter structure includes a box-shaped body, an inlet mouth and an outlet mouth suited to allow the passage of a gas flow and defined on the box-shaped body, wherein inside the box-shaped body there are a metering device suited to measure one or more parameters for the determination of the gas flow rate, and a filter suited to filter the gas flow. The filter comprises a dust deposit chamber for the dust present in the gas flowing in, the dust deposit chamber having an inlet opening communicating with the inlet mouth of the box-shaped body, a dust collection bottom and a filtering outlet wall provided with through openings; the dust deposit chamber is configured in such a way that the gas flows into it through the inlet opening and flows out of it through the through openings of the filtering outlet wall.

11 Claims, 10 Drawing Sheets

(56) References Cited

FOREIGN PATENT DOCUMENTS

| EP | 1 128 167 A9 | 11/2001 |
|----|---|---|
| EP | 2 813 824 A1 | 12/2014 |
| FR | 2 238 917 A | 3/1974 |
| GB | 2 286 975 A | 9/1995 |

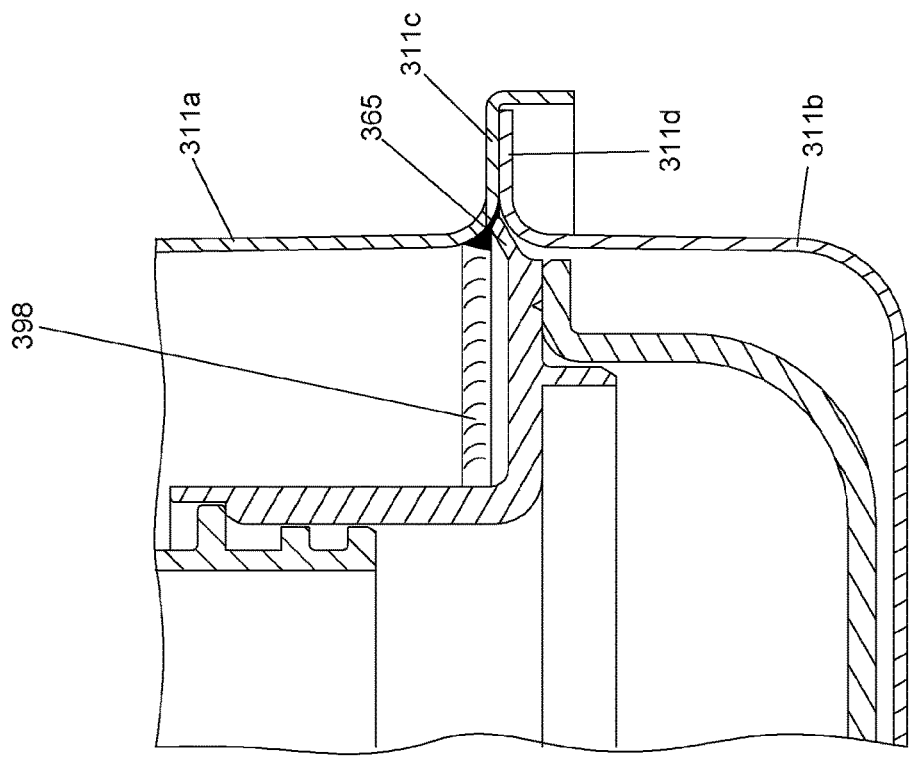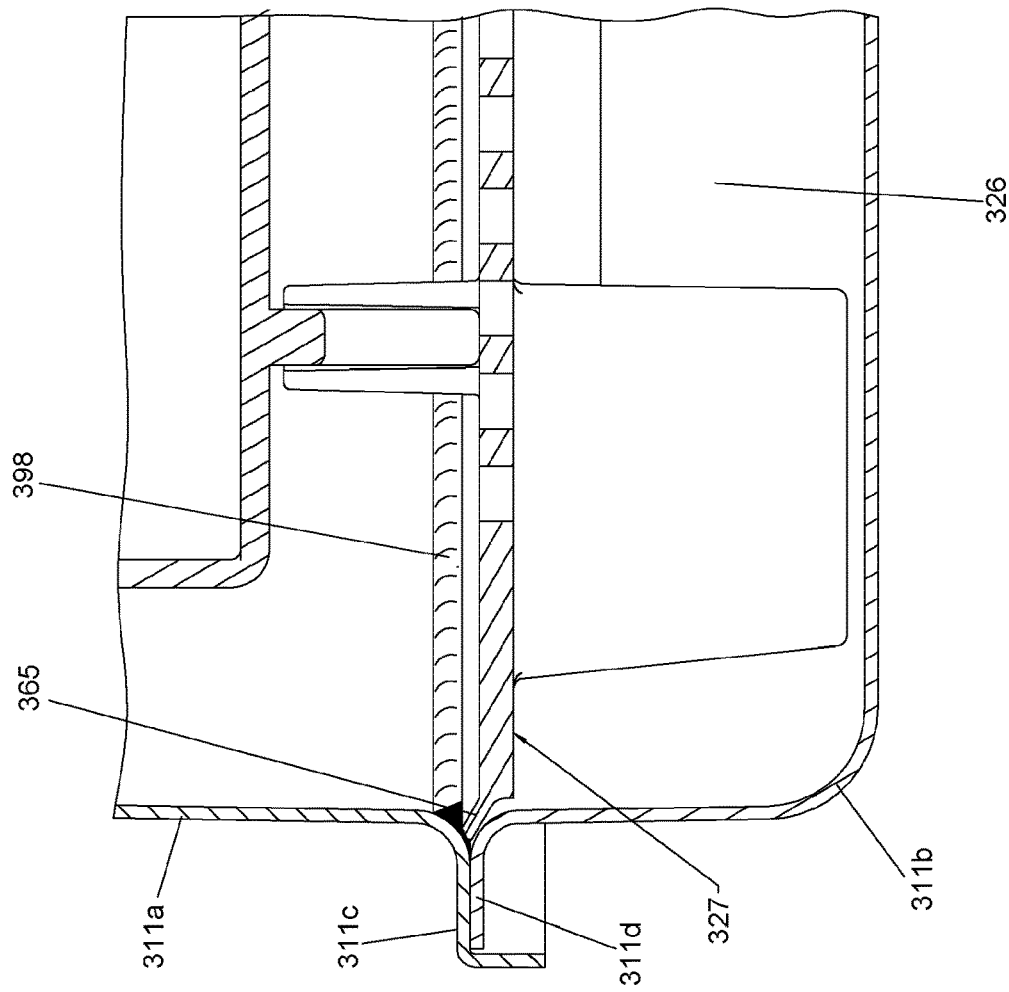
Fig.10

GAS METER STRUCTURE WITH FILTERING ARRANGEMENT INCLUDING A DUST DEPOSIT CHAMBER

BACKGROUND OF THE INVENTION

1. The Field of the Invention

The invention concerns a gas meter structure.

2. The Relevant Technology

Gas meters of the static type, meaning gas meters that do not have moving members, are currently known and widespread.

Said gas meters of the known type generally comprise:
a box-shaped body or casing,
an inlet mouth and an outlet mouth designed to allow the passage of a gas flow and defined on the box-shaped body,
wherein inside the box-shaped body there are:
an on-off valve suited to intercept the gas flow through said gas meter,
a metering device suited to measure one or more parameters for the determination of the gas flow rate,
filtering means suited to filter the gas flow.

Inside the metering device there is/are one or more sensors designed to measure one or more dimensions that are useful for measuring the gas flow rate directly or indirectly, that is, by processing the measured data; said metering device transmits the measured data to an electronic control unit located outside the metering unit.

Nowadays, in the sector of gas meters, there is an increasing need for equipment in which the fouling of the sensor or sensors operating inside the flow rate metering device is minimized and preferably eliminated, in order to maintain the metering error curve within the limits set by the regulations in force over the entire life of the product.

Nowadays, gas meters are known which, in order to hold back the particles contained in the gas flow coming from the gas supply network, are provided with filtering means based on the principle of static electricity and/or on the principle of mechanical restraint.

In these filtering means, the dust contained in the gas is held back by a cloth before the gas flow enters the metering device in which the measurement is carried out.

However, this solution has an intrinsic limitation.

In fact, when the upper layer of the cloth is completely saturated with dust, it cannot be guaranteed any longer that more dust will be held back.

In these known filtering means, the gas flowing into the gas meter follows a path along which it first enters through an inlet connection element, is deviated by 90° and then hits a flow deviation barrier consisting of a cloth that holds back the particles contained in the gas; in the meantime, the largest and heaviest particles are deposited on the bottom of the box-shaped body of the gas meter, while the main gas flow consisting of the lighter particles is deviated in such a way that it leaves the deviation barrier through a passage located between said barrier and the bottom of the box-shaped body of the gas meter, and then enters the controlled space of the metering device.

When the cloth making up the deviation barrier cannot hold back the dust suspended in the gas flow any longer, said dust remains in the gas flow and thus ends up with fouling the metering device positioned downstream of the filtering means.

Furthermore, there is the risk that the gas flow, which is deviated in such a way that it moves through a passage and thus touches the bottom of the box-shaped body, may carry part of the heavier particles that have deposited on the bottom of the box-shaped body due to gravity.

Another limitation of the known gas meters is constituted by the fact that the on-off solenoid valve, if present, is often positioned at the level of the inlet mouth of the meter; in this position, the solenoid valve is thus affected by the flow of the dust contained in the gas coming from the supply network.

A mechanical filter, for example a filter of the type with metal mesh, configured to hold back the larger sized particles, may be positioned before the valve but, in any case, once said filter is saturated, even partially, the finer dust falls inside the solenoid valve by gravity, thus negatively affecting its operation over time.

Furthermore, as the filter becomes saturated, the resistance of the same to the gas flow increases, which consequently leads to an increase in the pressure difference between the distribution network, which is located upstream of the meter, and the exit of the latter, which consequently modifies the fluid-dynamic conditions inside the gas meter in an undesired manner.

Furthermore, the particles are not collected in a circumscribed space and are continuously hit by the main gas flow before the latter enters the solenoid valve which, therefore, ends up with collecting most of said particles.

Other known types of gas meter with similar limitations are described in the documents U.S. Pat. No. 5,220,830 A and US 2012/0118407 A1.

The need to make gas meters safe against tampering attempts is increasingly felt in the sector.

More specifically, gas meters are currently known which comprise a box-shaped body provided with an inlet mouth and an outlet mouth, both facing upwards with respect to a normal configuration of use of the gas meter; inside the box-shaped body there may be, in the given order, a mechanical filter, at the level of the inlet mouth, a solenoid valve designed to intercept the flow and a metering device suited to measure one or more parameters for the determination of the gas flow rate such as, for example, a device of the static type provided with temperature sensors.

In said gas meters of the known type, the metering device is directly connected to the outlet connection element and arranged so that it is adjacent to the latter, a position in which the metering device is likely to be tampered with since, as explained above, the current regulations do not require the outlet connection element to be sealed.

The presence of a mesh protection filter between the metering device and the outlet connection element does not seem to be an effective solution in case of tampering attempts, either, such attempts including, for example, the attempt to disconnect the metering device, to foul the one or more sensors present in the metering device, to damage it with compressed air, and similar attempts.

SUMMARY OF THE INVENTION

It is the object of the present invention to implement a gas meter structure that is capable of overcoming the above-mentioned drawbacks and limitations of the known art.

More specifically, it is an object of the invention to provide a gas meter in which the metering device and the solenoid valve are more protected from the dust contained in the gas coming from the gas supply network.

It is another object of the invention to provide a gas meter that is safer against tampering attempts.

Again, it is an object of the invention to provide a gas meter whose performance levels are not lower than those ensured by the known gas meters.

It is another object of the invention to provide a gas meter that is capable of operating within the limits set by the regulations in force.

BRIEF DESCRIPTION OF THE DRAWINGS

The purpose and the objects illustrated above, as well as the advantages that will be described further on, are highlighted in the description of an embodiment of the invention that is provided by way of non-limiting example with reference to the attached drawings, wherein:

FIG. 10 shows a sectional view of a detail of FIG. 8.

DETAILED DESCRIPTION OF THE PREFERRED EMBODIMENTS

Figure 1:
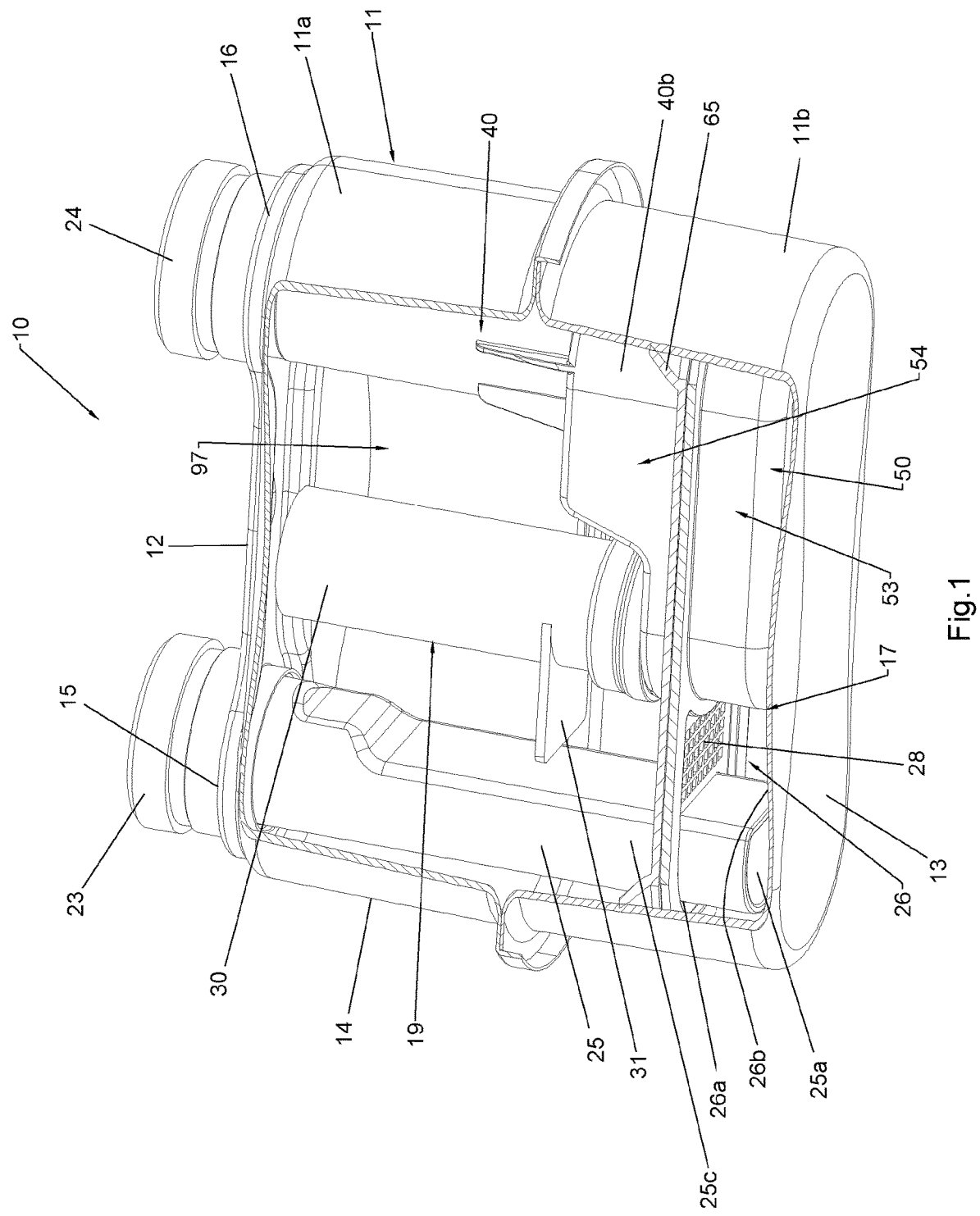
FIG. 1 shows a perspective sectional view of a gas meter structure according to the invention.
Figure 2:
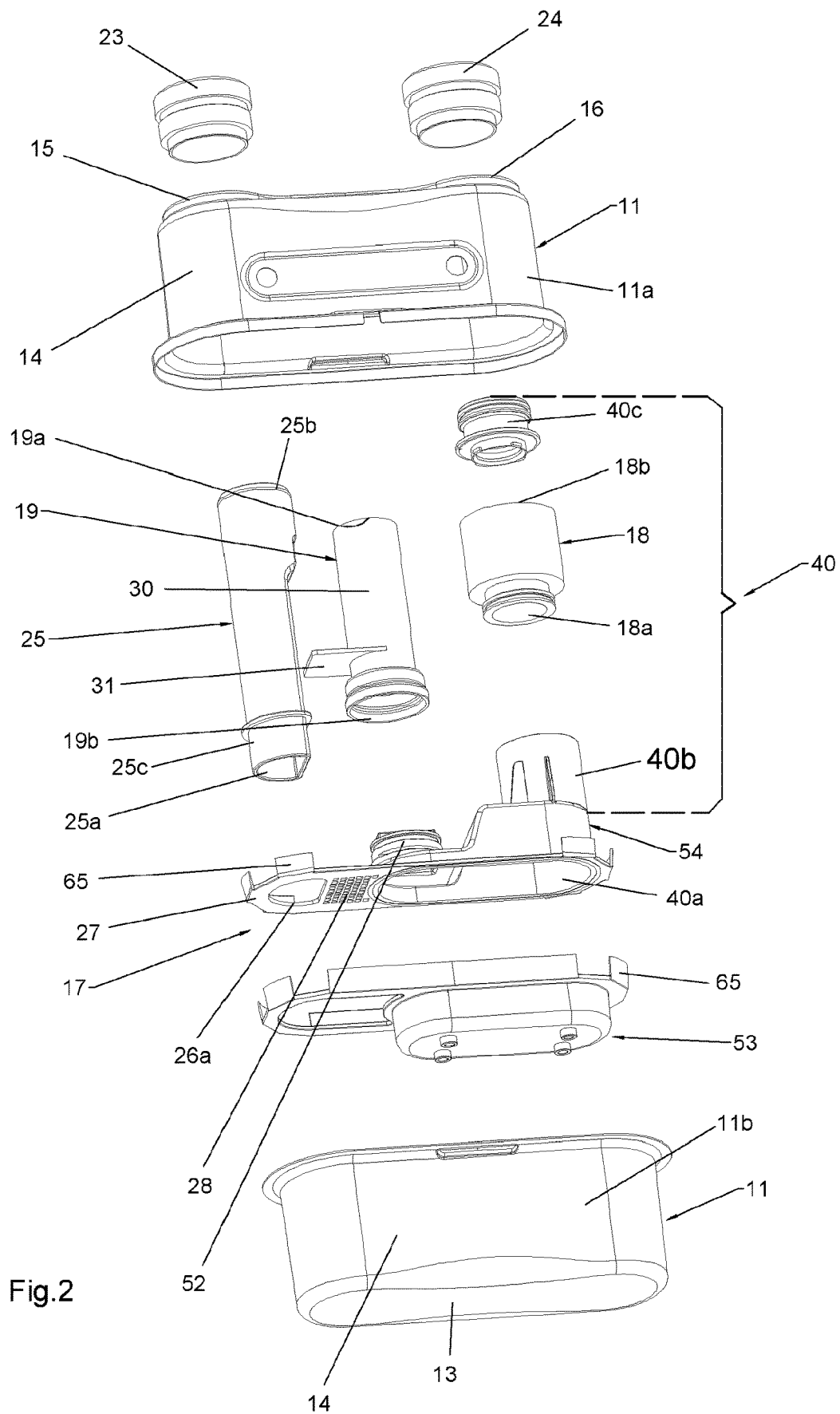
FIG. 2 shows a perspective exploded view of a gas meter structure according to the invention.

With reference to the figures mentioned above, a gas meter structure according to the invention is indicated as a whole by the numeral 10.

Said gas meter structure 10 comprises:
a box-shaped body 11,
an inlet mouth 15 and an outlet mouth 16 designed to allow the passage of a gas flow and defined on said box-shaped body 11,
wherein inside the box-shaped body 11 there are:
a metering device 19 suited to measure one or more parameters for the determination of the gas flow rate,
filtering means 17 suited to filter the gas flow.

The specific characteristic of the gas meter structure 10 according to the invention lies in that the filtering means 17 comprise a dust deposit chamber 26 for the dust present in the gas flowing in, said dust deposit chamber 26 comprising an inlet opening 26a, communicating with the inlet mouth 15 of the box-shaped body 11, a bottom 26b designed to collect the dust, and a filtering outlet wall 28 provided with through openings 28a, said dust deposit chamber 26 being configured in such a way that the gas flows into it through said inlet opening 26a and flows out of it through the outlet openings 28a of said filtering outlet wall 28.

Figure 4:
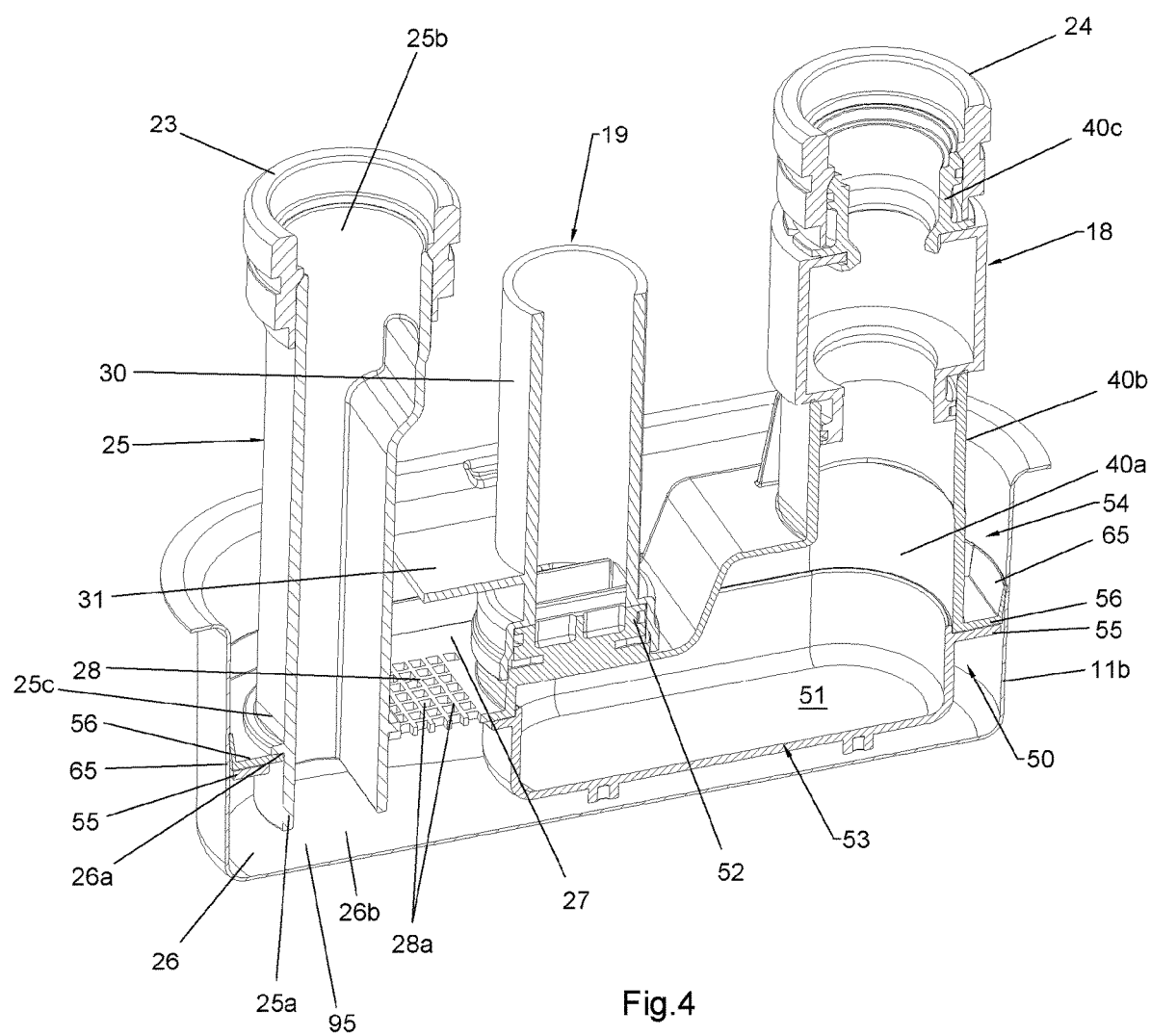
FIG. 4 shows a further perspective sectional view of the gas meter structure according to the invention.
Figure 5:
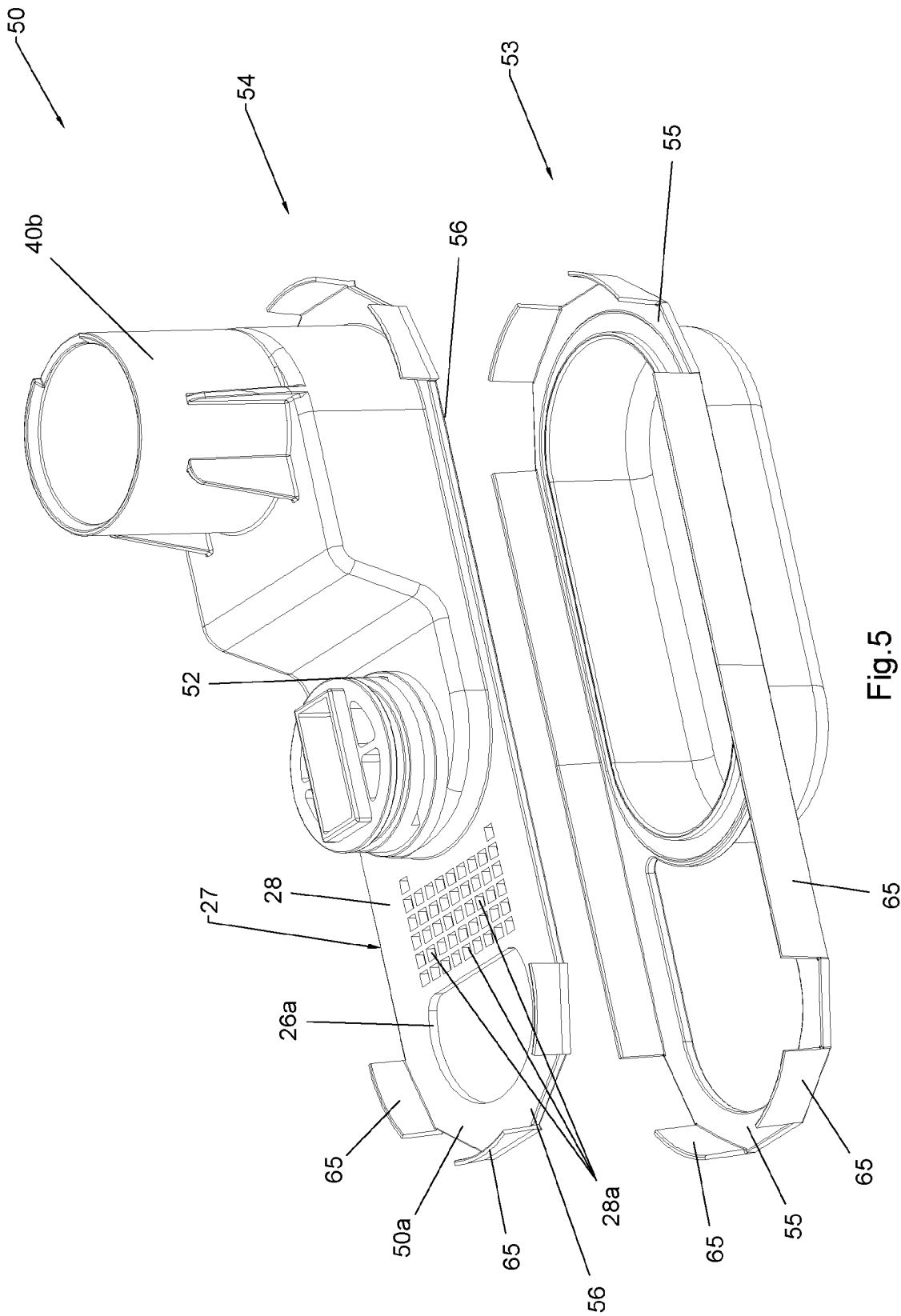
FIG. 5 shows an exploded perspective view of a detail of the gas meter structure according to the invention.

The through openings 28a are clearly visible in FIGS. 4 and 5.

In the present example of embodiment, the gas meter structure 10 comprises also an on-off valve 18 suited to intercept the gas flow through the gas meter structure 10.

Said on-off valve 18 is positioned, for example, at the level of the outlet mouth 16.

In the present non-limiting example of embodiment of the invention, the gas meter structure 10 comprises an inlet duct 25 extending from the inlet mouth 15 to the inlet opening 26a of the dust deposit chamber 26.

The inlet duct 25 has a first end 25a, to be considered as a lower end with respect to a normal configuration of use, and a second opposite end 25b, to be considered as an upper end, which are clearly visible in FIGS. 1, 2, 3 and 4.

Said inlet duct 25 is open at the level of its first end 25a.

Said inlet duct 25 is configured in such a way as to direct the gas flowing in against the bottom 26b.

The contact of the gas flow with the bottom 26b causes dust to be deposited on the bottom 26b itself, due both to gravity and to the adhesion of dust to the surface of the bottom 26b, wherein said surface, thanks to its inherent roughness, holds back the dust that reaches it.

The inlet duct 25 is constituted, for example, by a tubular element.

The inlet duct 25 comprises a section 25c suitable for connection with the inlet opening 26a of the dust deposit chamber 26.

Figure 3:
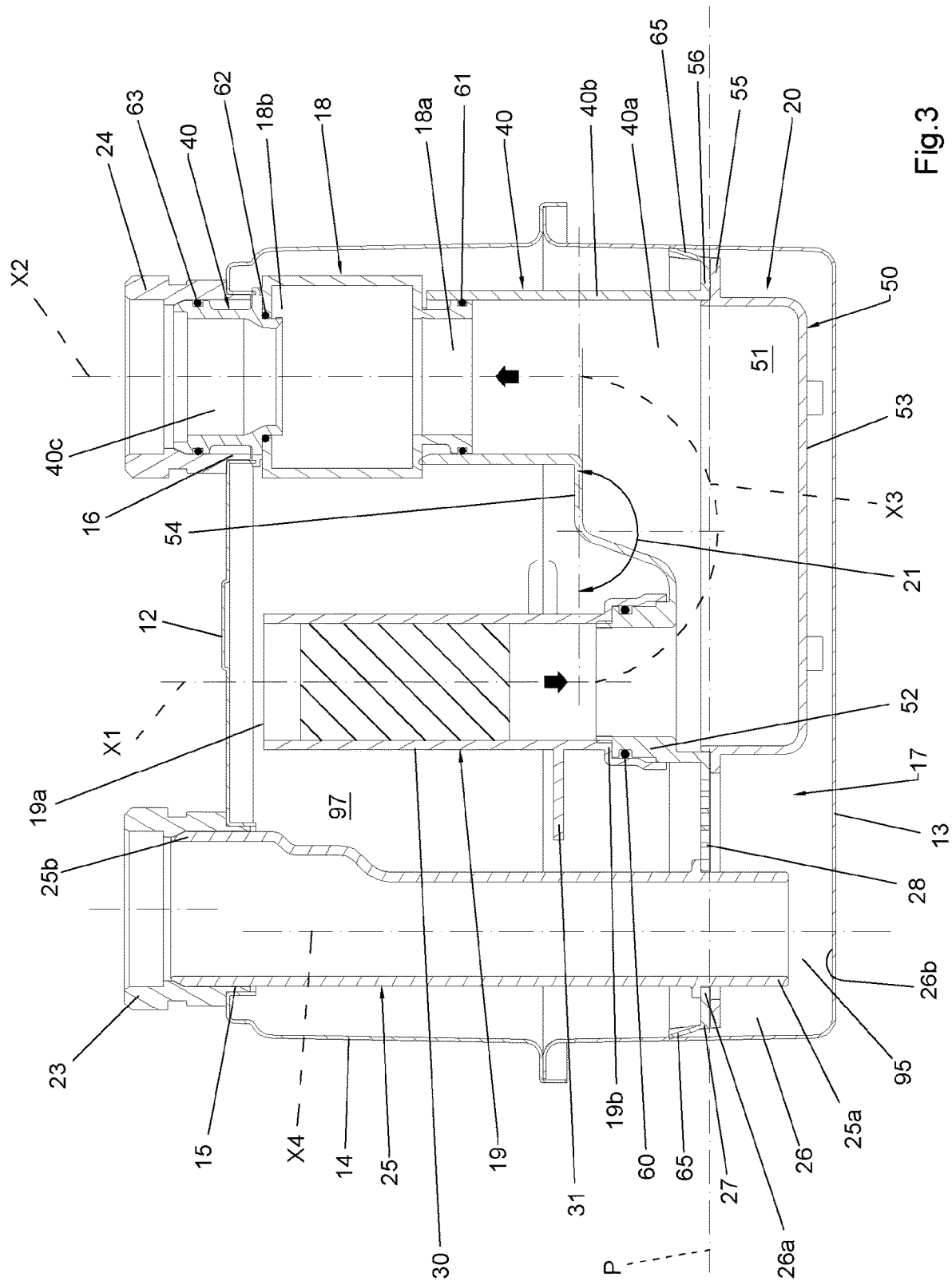
FIG. 3 shows a side sectional view of a gas meter according to the invention.

A passage space 95, clearly visible in FIGS. 3 and 4, is defined between the first end 25a of the inlet duct 25 and the bottom 26b and is intended to allow the gas to flow out of the end 25a of the inlet duct 25 itself.

Said passage space 95 is configured to allow the gas to flow from the inlet duct 25 to the bottom 26b and from there to the filtering outlet wall 28.

The gas flowing in through the inlet mouth 15 is thus forced by the inlet duct 25 to get into the deposit chamber 26, to flow through the passage space 95 and finally flow out of the deposit chamber 26 through the filtering outlet wall 28.

In the present example of embodiment, the dust deposit chamber 26 is defined on the opposite side of the box-shaped body 11 with respect to the inlet mouth 15.

The dust deposit chamber 26 extends radially with respect to the direction X4 of extension of the final section 25c of the inlet duct 25, beyond the corresponding radial dimension of the same final section of the inlet duct 25.

The filtering wall 28 is positioned laterally with respect to the inlet opening 26a of the deposit chamber 26.

In this way, the gas flows in through the inlet mouth 15 in a substantially vertical direction from top to bottom, enters the dust deposit chamber 26 and there its trajectory is deviated towards the filtering outlet wall 28 by the dust collection bottom 26b.

The trajectory of the gas flow is deviated by the dust collection bottom 26b by substantially 180°.

This configuration favours the deposit of dust on the dust collection bottom 26b.

The filtering wall 28 is defined on a mechanical filtering partition 27.

Said mechanical filtering partition 27 is configured to divide the inner space of the box-shaped body 11 into two chambers, the dust deposit chamber 26 and a recirculation chamber 97.

The outer perimeter of the mechanical filtering partition 27 is shaped in such a way as to imitate the inner sectional outline of the box-shaped body 11, that is, in such a way that its perimeter edges are arranged in proximity to or in contact with the inner surface of said box-shaped body 11.

In the present example of embodiment, the dust deposit chamber 26 is defined below the recirculation chamber 97.

Said recirculation chamber 97 is configured in such a way that the gas flowing through the filtering wall 28 exits from the deposit chamber 26 and circulates until reaching the inlet opening 19a of a metering device 19.

In the present non-limiting example of embodiment of the invention, the dust deposit chamber 26 is thus defined between the bottom side 13 of the box-shaped body 11 and a mechanical filtering partition 27 interposed between the bottom side 13 and the top side 12.

Said mechanical filtering partition 27 comprises the filtering outlet wall 28.

The mechanical filtering partition 27 comprises also the inlet opening 26a of the dust deposit chamber 26.

The mechanical filtering partition 27, as can be clearly seen in the figures, develops according to a reference plane P, indicated in FIG. 4, which lies crosswise with respect to the direction X4 of extension of the inlet duct 25 at the level of the section 25c connecting it with the inlet opening 26a of the same mechanical filtering partition 27.

More specifically, in the present example of embodiment, the mechanical filtering partition 27 develops according to a reference plane P which is orthogonal to the direction X4 of extension of the inlet duct 25 at the level of the section 25c connecting it with the inlet opening 26a of the same mechanical filtering partition 27.

Sealing means are provided between the mechanical filtering partition 27 and the inner surface of the box-shaped body 11, said sealing means being configured to prevent the passage of gas between the dust deposit chamber 26 and the rest of the inner space of the box-shaped body 11.

In the present example of embodiment, said sealing means comprise perimeter sealing edges 65, configured in such a way as to be placed in contact with the inner surface of the box-shaped body 11.

Said perimeter sealing edges 65 are configured in such a way that they press against the inner surface of the box-shaped body 11, providing a sealing action against the passage of gas containing fine dust.

Said perimeter sealing edges 65 are described in greater detail below.

In a variant embodiment of the invention, for example in the variant embodiment illustrated in Figures from 8 to 10, the sealing means comprise a glue bead 365 positioned in such a way as to seal the perimeter contact area between the edge of the mechanical filtering partition 327 and the inner surface of the box-shaped body 311.

In a further variant embodiment, the sealing means are constituted by a weld positioned in such a way as to seal the perimeter contact area between the edge of the mechanical filtering partition 327 and the inner surface of the box-shaped body 311.

In a further variant embodiment, not illustrated herein for the sake of simplicity, the sealing means are constituted by a perimeter gasket pressed between the edge of the mechanical filtering partition 327 and a facing portion of the inner surface of the box-shaped body 311.

As already mentioned above, inside the box-shaped body 11 there are:
 an on-off valve 18 suited to intercept the gas flow through the gas meter structure 10, said on-off valve 18 being provided with an inlet opening 18a and an outlet opening 18b,
 and a metering device 19 suited to measure one or more parameters for the determination of the gas flow rate; even said metering device 19 has an inlet opening 19a and an outlet opening 19b of its own.

The gas meter structure 10 according to the invention comprises:
 an inlet duct 25 extending from the inlet mouth 15 towards an opposite side 13 of the box-shaped body 11,
 an outlet duct 40 extending from the outlet mouth 16 towards an opposite side 13 of the box-shaped body 11.

The metering device 19 is positioned in an intermediate area between the inlet duct 25 and the outlet duct 40.

In the present example of embodiment, the box-shaped body 11 comprises, with respect to a normal configuration of use, a top side 12, an opposite bottom side 13 and a side wall 14.

The outlet mouth 16 is defined on the top side 12.

More specifically, the inlet mouth 15 and the outlet mouth 16 are defined on the top side 12.

It must be understood that the inlet mouth 15 and the outlet mouth 16 can both be provided on another, yet the same, side different from the top side 12.

It must be understood that the inlet mouth 15 and the outlet mouth 16 can each be provided on a respective side of the box-shaped body 11, different from the side on which the other mouth is provided.

In the present example of embodiment, the on-off valve 18 is positioned at the level of said outlet mouth 16 of the box-shaped body 11.

In the present example of embodiment, the on-off valve 18 is a part of the outlet duct 40.

In the present example of embodiment, the gas meter structure 10 comprises a first threaded connection element 23 at the level of the inlet mouth 15 of the box-shaped body 11 and a second threaded connection element 24 at the level of the outlet mouth 16 of the box-shaped body 11.

As already mentioned above, the mechanical filtering partition 27 comprises the filtering outlet wall 28.

The dimensions of the through openings 28a of the filtering outlet wall 28 are such that they constitute an obstacle against the passage of dust.

More specifically, the dimensions of said through openings 28a are such as to hinder the passage of dust particles with particularly large diameter, meaning that said through openings 28a have a cross section whose main dimension, for example their side if they are square in shape or their diameter if they are round in shape, is included between 0.5 and 3 mm, and preferably is equal to 1 mm.

In the present example of embodiment, the filtering outlet wall 28 is constituted by a portion of the mechanical filtering partition 27.

The mechanical filtering partition 27 is constituted, for example, by a flat element made of a plastic material.

The mechanical filtering partition 27 is constituted, again for example, by a single-layer element made of a plastic material.

Said plastic material is, for example, polypropylene.

In a variant embodiment of the invention, the filtering outlet wall 28 may comprise several filtering layers, sandwich-layered or spaced from one another, each layer consisting of a mesh or a net of a non-woven fabric.

The inlet duct 25 extends from the inlet mouth 15 of the box-shaped body 11 to the inside of the dust deposit chamber 26.

Said inlet duct 25 is configured in such a way that the gas flowing in through the first threaded connection element 23 is not dispersed in the inner compartment of the box-shaped body 11 but is directly and completely conveyed into the dust deposit chamber 26.

More specifically, the inlet duct 25 reaches the inside of the dust deposit chamber 26 with one of its ends 25a, through the inlet opening 26a.

The mechanical filtering partition 27 is provided with, that is, comprises the inlet opening 26a of the dust deposit chamber 26.

Said dust deposit chamber 26 is configured in such a way that the gas flow coming from the inlet duct 25 can exit from it only through the filtering wall 28 of the mechanical filtering partition 27.

In the embodiment of the invention described herein by way of example without limitation of the invention itself, the filtering partition 27 is a part of a shaped body 50 positioned inside the box-shaped body 11.

More specifically, the filtering partition 27 is constituted by a flat portion 50a extending from the shaped body 50, wherein said flat portion 50a is shaped in such a way as to imitate the inner sectional outline of the box-shaped body 11, that is, in such a way that the perimeter edges of said flat portion 50a are arranged in proximity to or in contact with the inner surface of the box-shaped body 11.

In the present example of embodiment, as already mentioned above, the mechanical filtering partition 27 is provided with sealing means constituted by perimeter sealing edges 65, configured in such a way as to be placed in contact with the inner surface of the box-shaped body 11 and press against it providing a sealing action against the passage of gas containing fine dust.

Even more specifically, in the present example of embodiment the shaped body 50 is constituted by a container 53 closed by a shaped cover 54.

The container 53 has a first rest edge 55 where a corresponding second rest edge 56 of the shaped cover 54 can be rested.

Said first rest edge 55 and second rest edge 56 are sealed together, for example by means of a heat welding operation or of other similar or equivalent sealing methods.

The perimeter sealing edges 65, for example, extend partially from the first rest edge 55 and partially from the second rest edge 56, as shown in FIG. 5.

Said perimeter sealing edges 65, for example, are made in polypropylene.

Advantageously, said sealing edges 65 are made in a single body, together with either the rest edges 55 or 56, or the flat portion 50a.

The shaped body 50 is positioned in proximity to the bottom side 13 of the box-shaped body 11.

The container 53, together with the first rest edge 55, is made up of a single piece in a plastic material.

The shaped cover 54, together with the second rest edge 56, is made up of a single piece in a plastic material.

Inside the box-shaped body 11 there are means 20 configured to deviate the gas flow that exits from the outlet opening 19b of the metering device 19 towards the inlet opening 40a of the outlet duct 40.

Said means 20, configured in such a way as to deviate the gas flowing out through the outlet opening 19b of the metering device 19 towards the inlet opening 40a of the outlet duct 40, define a trajectory X3 comprising a deviation that develops over a deviation angle 21 between a direction X1 crossing the metering device 19 and a direction X2 crossing the outlet duct 40, said deviation angle 21 being included in an interval ranging between a neighbourhood of 90° and 225°.

The expression 'neighbourhood of 90°' is used to indicate an interval between −15° and +15° with respect to 90°.

Said deviation angle 21 is preferably included between 91° and 225°.

More specifically, said deviation angle 21 is equal to 180°, as clearly visible in FIGS. 3 and 4.

In the present example of embodiment, which obviously must be understood as a non-limiting example of the invention, the metering device 19 is positioned, as mentioned above, midway between the outlet duct 40 and the inlet duct 25, beside both the outlet duct 40 and the inlet duct 25.

In said intermediate position, and thanks to the means 20 for deviating the gas flow that exits from the outlet opening 19b of the metering device 19 towards the inlet opening 40a of the outlet duct 40, the metering device 19 is substantially inaccessible in case of any tampering attempt made both through the outlet mouth 16 and through the inlet mouth 15 of the box-shaped body 11, if this should be the case.

In fact, due to the presence of the inlet duct 25 and the mechanical filtering partition 27, on the one hand, and of the on-off valve 18 and the flow deviation means 20, on the other hand, the metering device 19 is substantially positioned at the centre of a maze-like route that cannot be accessed using the currently known break-in tools.

In the present example of embodiment, the inlet duct 25 is constituted by a tubular element that extends along a crossing direction X4.

Said crossing direction X4 corresponds to the direction of extension X4 indicated above.

The crossing direction X4 is preferably parallel to the crossing direction X1 of the metering device 19 and to the crossing direction X2 of the outlet duct 40.

In the present example of embodiment, the outlet duct 40 comprises:

an entry section 40b, in turn comprising the inlet opening 40a, an exit section 40c, the on-off valve 18, interposed between the entry section 40b and the exit section 40c.

The on-off valve 18 is connected to the entry section 40b and to the exit section 40c in such a way that it is coaxial with both of them.

The exit section 40c is constituted by a sleeve positioned in such a way that it passes through the outlet mouth 16 and is coupled with the second threaded connection element 24.

The metering device 19, for example, is a flow rate meter of the static type.

Said metering device 19 comprises a transit pipe 30 designed to allow the transit of the gas flow and including the inlet opening 19a and the outlet opening 19b, and inside which real sensors are provided.

An intercepting projection 31 may extend from the transit pipe 30, said intercepting projection being designed to meet the gas flow coming from the filtering outlet wall 28.

Said intercepting projection 31 is constituted, for example, by a flat element extending from the transit pipe 30 according to a reference plane lying crosswise with respect to the flowing direction of the gas flow.

In a variant embodiment of the invention, the metering device 19 comprises an electronic interface unit that is external to the transit pipe 30 and is configured in such a way that it can receive the metering signals emitted by the sensors, transmit said signals to a remote control unit and power the sensors.

More specifically, in the present example of embodiment of the gas meter structure 10 according to the invention, the metering device 19 is positioned with its crossing direction X1 parallel to the crossing direction X2 of the outlet duct 40.

More specifically, the metering device 19 is positioned with the inlet opening 19a in proximity to the top side 12 of the box-shaped body 11.

Even more specifically, the inlet opening 19a faces upwards with respect to a normal configuration of use of the gas meter structure 10.

In the present example of embodiment, the through openings 28a of the filtering outlet wall 28 are positioned on the flat portion 50a, between the inlet opening 26a and the shaped body 50; in this way, the gas flow is forced to pass only and exclusively through said through openings 28a.

Alternatively, other through openings 28a can be provided on the filtering partition 27, for example around the inlet opening 26a.

Even more specifically, the metering device 19 is positioned in such a way that the intercepting projection 31, or the electronic interface unit, if present on the metering device 19 and in this case defining the intercepting projection 31 and serving an equivalent function, is arranged above the filtering outlet wall 28, meaning above the through openings 28a; in this case, thanks to the specific position of the through openings 28a located on said flat portion 50a only between the inlet opening 26a and the shaped body 50, the intercepting projection 31, or the casing of the electronic interface unit, if provided, cooperates to deviate the gas flow and thus to filter the gas flow, since owing to its position said intercepting projection 31, or said casing of the electronic interface unit, accumulates on its surface any dust residues possibly present n the gas flow.

In this specific configuration of the gas meter structure 10, the mechanical filtering partition 27 is interposed between the bottom side 13 and the inlet opening 19a of the metering device 19.

More specifically, the mechanical filtering partition 27 is interposed between the bottom side 13 and the intercepting projection 31, or the casing of the electronic interface unit, if present, of the metering device 19.

In the embodiment of the invention described herein by way of non-limiting example of the invention itself, the means 20, configured in such a way as to deviate the gas flowing out through the outlet opening 19b of the metering device 19 towards the inlet opening 40a of the outlet duct 40, comprise the shaped body 50, inside which a deviation chamber 51 is defined.

In the present example of embodiment, the shaped body 50 comprises:
a joining collar 52 suitable for connection with the outlet opening 19b of the metering device 19,
and the entry section 40b of the outlet duct 40.

Both the joining collar 52 and the entry section 40b are obviously open and in communication with the deviation chamber 51.

In the present example of embodiment, as described above, the shaped body 50 is constituted by the container 53 closed by the shaped cover 54.

The joining collar 52 and the entry section 40b are defined on the shaped cover 54.

The metering device 19, the gas flow deviation means 20 and the outlet duct 40 are connected to one another in such a way as to define a tight path configured to prevent the leakage of the gas flow already measured by means of the metering device 19.

More specifically:
the outlet opening 19b of the metering device 19 and the joining collar 52 of the shaped body 50 are connected, with at least one sealing ring 60 interposed therebetween;
the entry section 40b of the outlet duct 40 and the inlet mouth 18a of the on-off valve 18 are coupled together, with at least one sealing ring 61 interposed therebetween;
the outlet mouth 18b of the on-off valve 18 and the exit section 40c are coupled together, with at least one sealing ring 62 interposed therebetween;
the exit section 40c and the second threaded connection element 24 are coupled together, with at least one sealing ring 63 interposed therebetween.

Thanks to this sequence of tight connections, the measured gas flow that exits from the metering device 19 cannot return into the inner compartment of the box-shaped body 11 and cannot be measured again by mistake.

In the present example of embodiment, the box-shaped body 11 comprises two half-shells 11a and 11b welded together.

Figure 6:
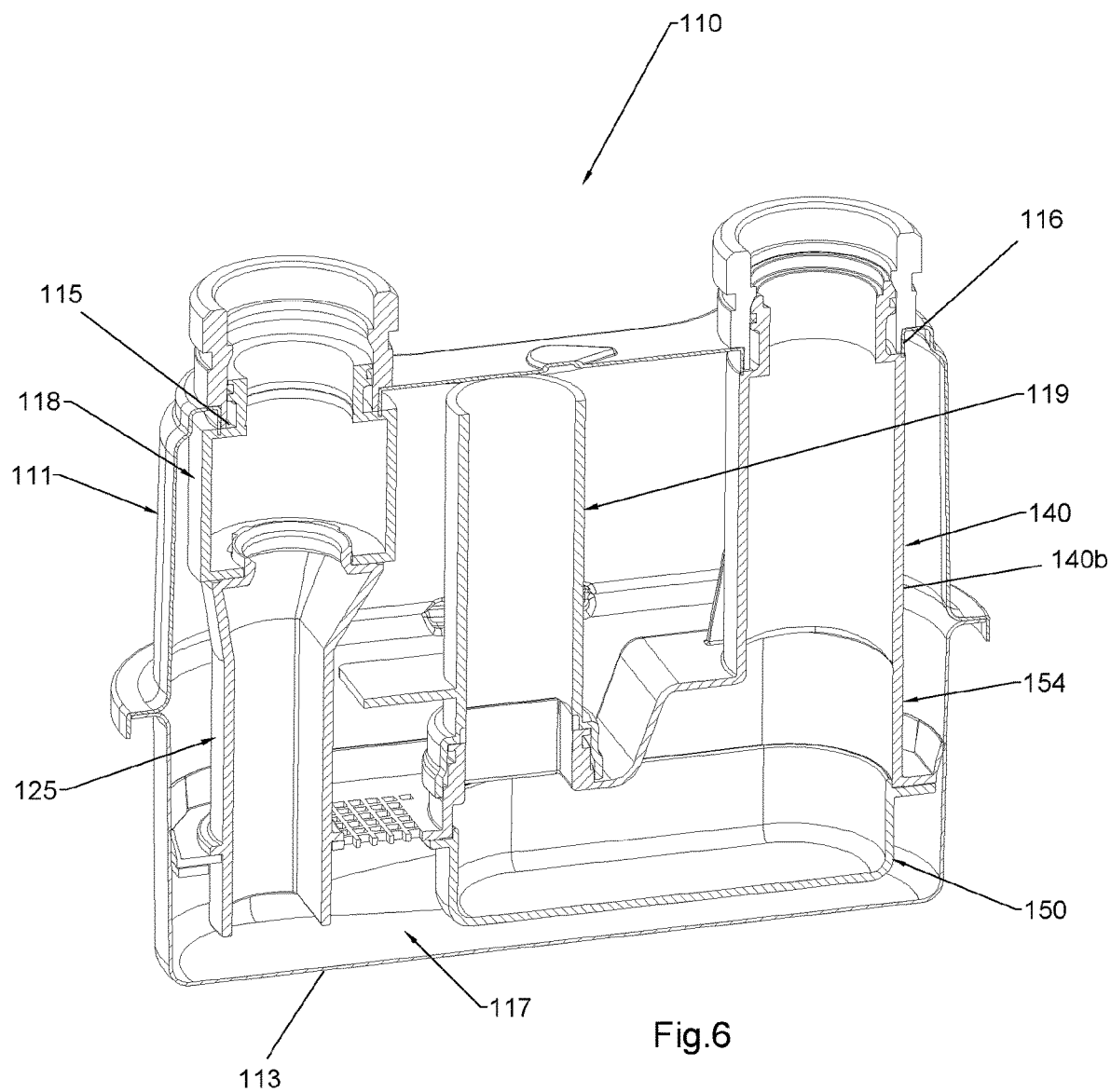
FIG. 6 shows a perspective sectional view of a variant embodiment of a gas meter structure according to the invention.

FIG. 6 shows a variant embodiment of the gas meter structure according to the invention, indicated therein by the numeral 110.

In this variant embodiment, analogously to what has been described above with reference to the preferred embodiment, the gas meter structure 110 comprises:
a box-shaped body 111,
an inlet mouth 115 and an outlet mouth 116 suited to allow the passage of a gas flow and defined on the box-shaped body 111,
wherein in the box-shaped body 111 there are:
filtering means 117,
a metering device 119 suited to measure one or more parameters for the determination of the gas flow rate,
an on-off valve 118 suited to intercept the gas flow through the gas meter 110.

In said variant embodiment, the gas meter structure 110 according to the invention comprises:
an inlet duct 125 extending from said inlet mouth 115 towards an opposite side 113 of the box-shaped body 111,
an outlet duct 140 extending from the outlet mouth 116 towards an opposite side 113 of the box-shaped body 111,
the metering device 119 being positioned in an intermediate area between the inlet duct 125 and the outlet duct 140.

In this variant embodiment, the on-off valve 118 is placed at the level of the inlet mouth 115 of the box-shaped body 111.

The outlet duct 140 is constituted by the entry section 140b of the shaped cover 154, said entry section 140b extending from the shaped body 150 to the outlet mouth 116.

The on-off valve 118 is a part of the inlet duct 125.

Figure 7:
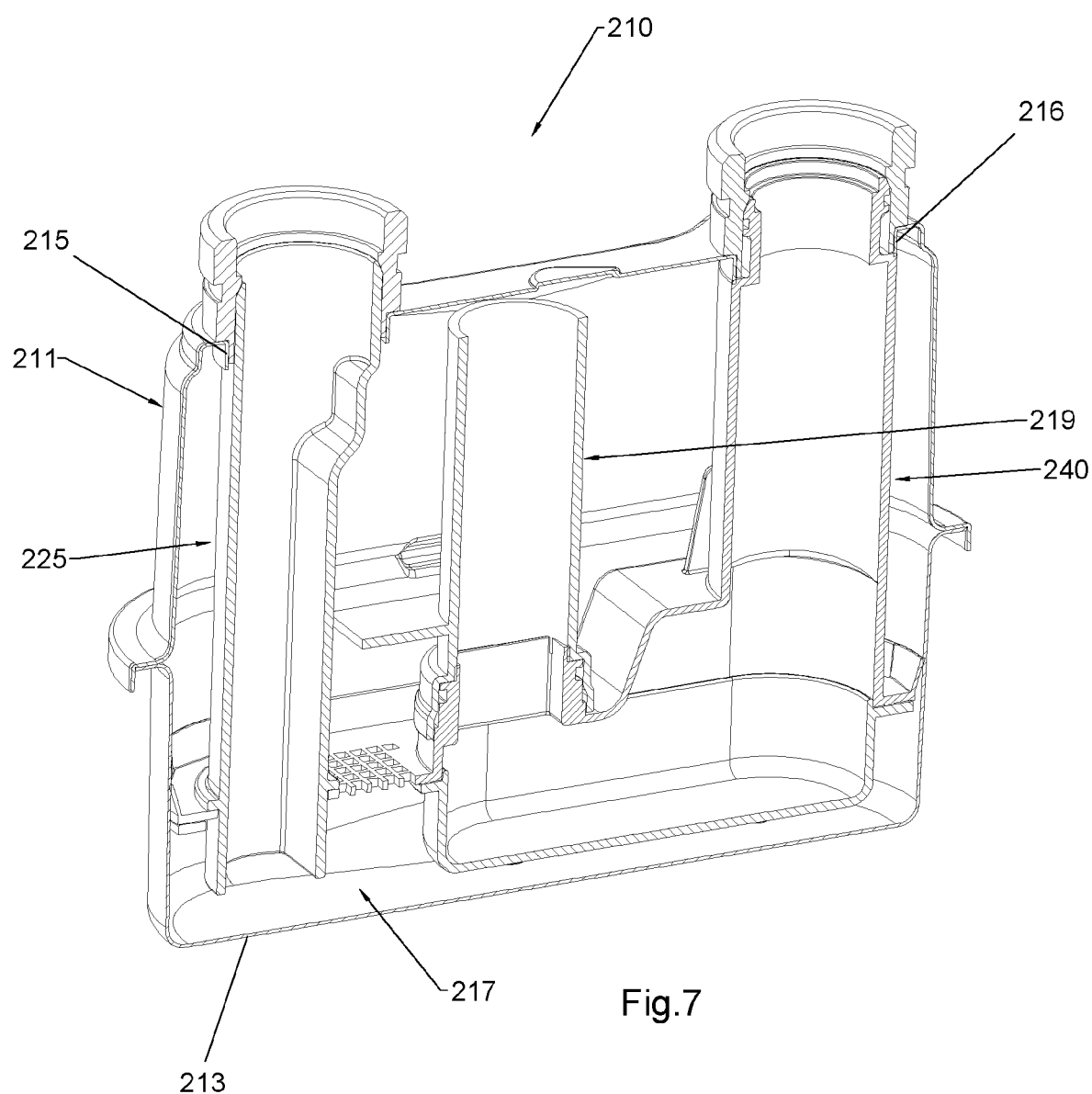
FIG. 7 shows a perspective sectional view of another variant embodiment of a gas meter structure according to the invention.
Figure 8:
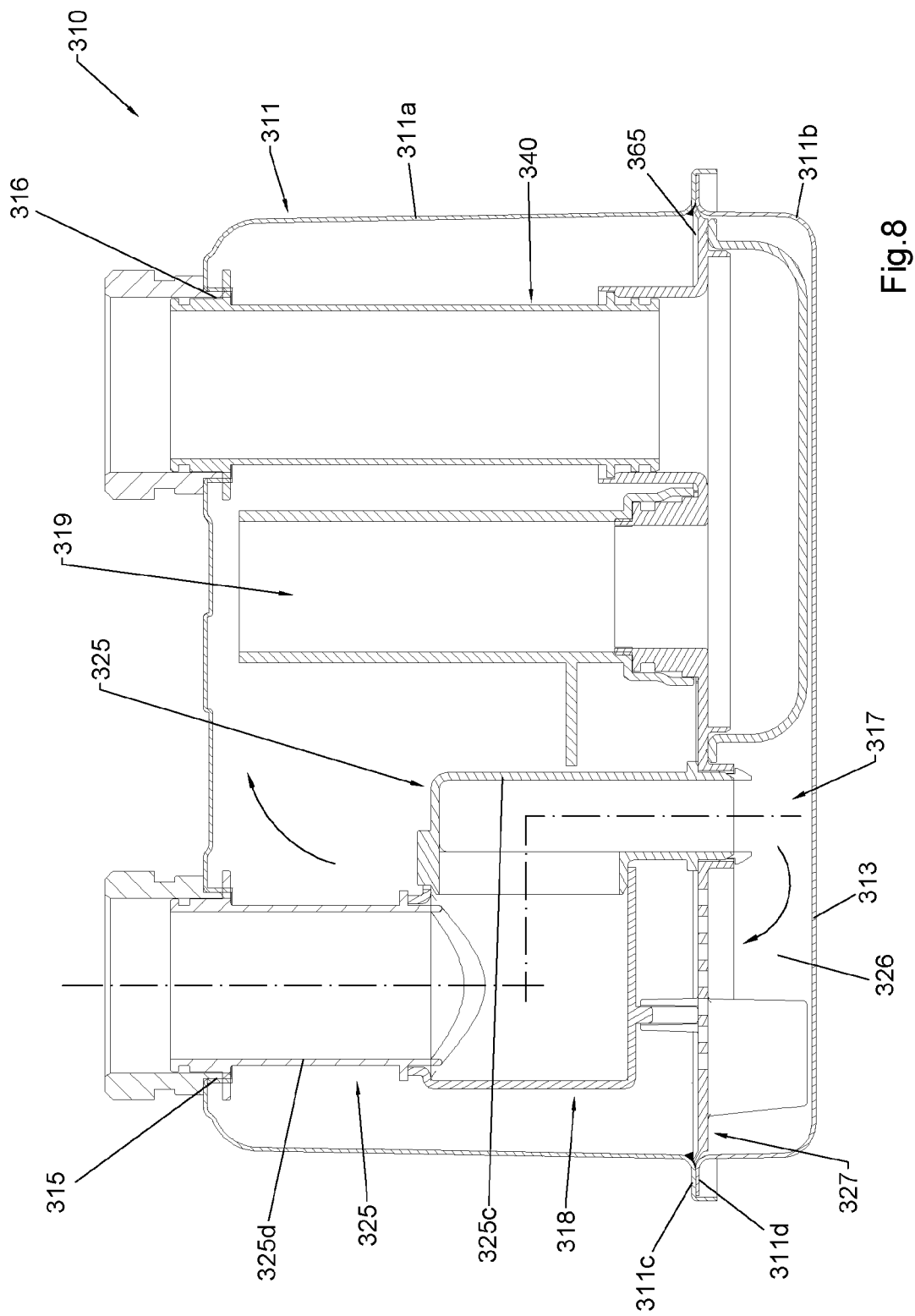
FIG. 8 shows a side sectional view of a gas meter structure according to the invention in a further variant embodiment.
Figure 9:
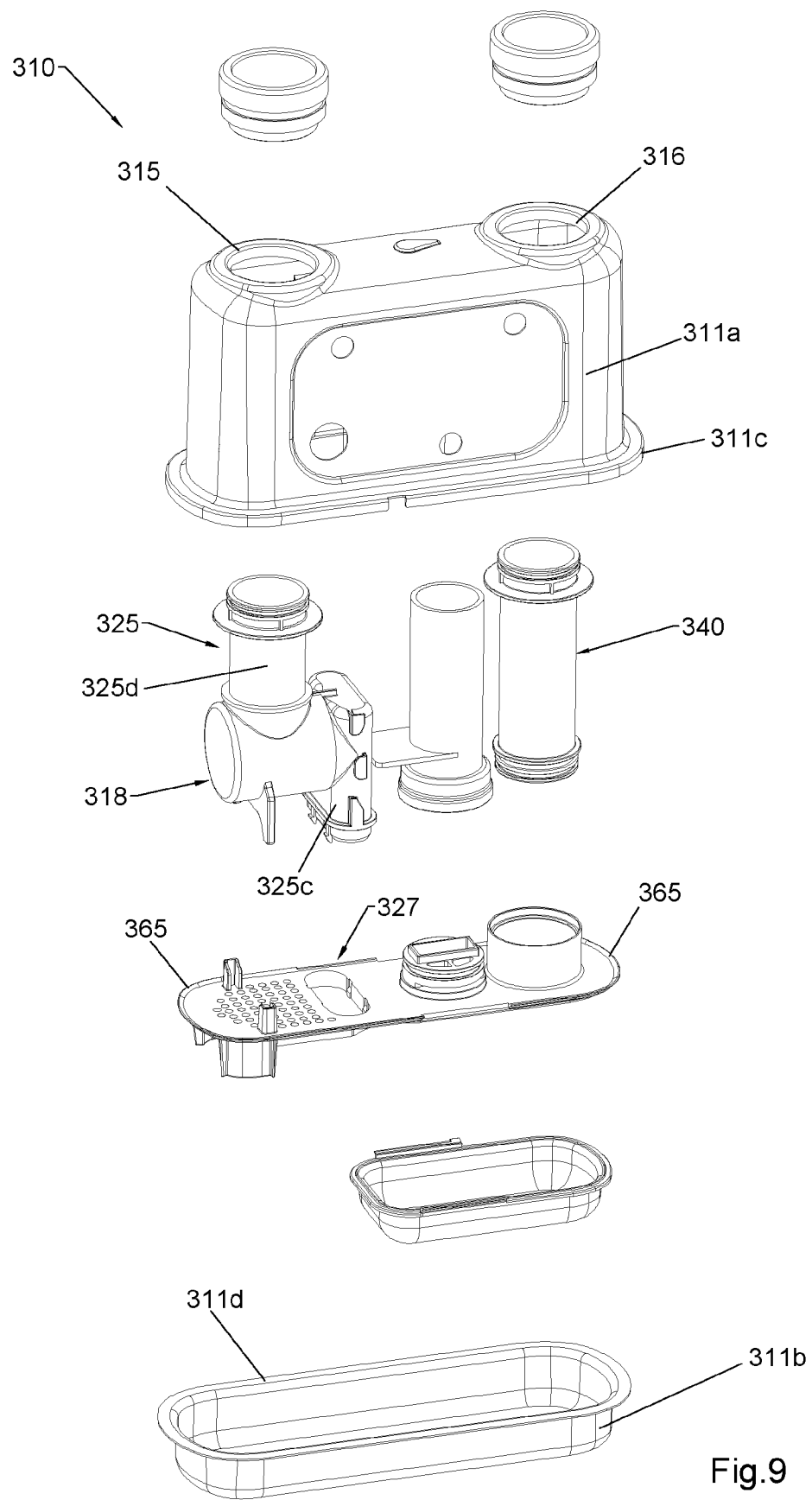
FIG. 9 shows an exploded perspective view of the gas meter structure in its further variant shown in FIG. 8.

FIG. 7 shows a further variant embodiment of the gas meter structure according to the invention, indicated therein by the numeral 210.

In this further variant embodiment, analogously to what has been described above with reference to the preferred embodiment, the gas meter structure 210 comprises:
a box-shaped body 211,
an inlet mouth 215 and an outlet mouth 216 suited to allow the passage of a gas flow and defined on the box-shaped body 211,
wherein inside the box-shaped body 211 there are:
filtering means 217,
a metering device 219 suited to measure one or more parameters for the determination of the gas flow rate.

In said variant embodiment, the gas meter structure 210 according to the invention comprises:
- an inlet duct 225 extending from said inlet mouth 215 towards an opposite side 213 of the box-shaped body 211,
- an outlet duct 240 extending between the outlet mouth 216 and an opposite side 213 of the box-shaped body 211,
- the metering device 219 being positioned in an intermediate area between the inlet duct 225 and the outlet duct 240.

In said variant embodiment, the on-off valve is not provided.

Figures from 8 to 10 show a further variant embodiment of the gas meter structure according to the invention, indicated therein by the numeral 310.

In this variant embodiment, analogously to what has been described above with reference to the other embodiments, the gas meter structure 310 comprises:
- a box-shaped body 311,
- an inlet mouth 315 and an outlet mouth 316 suited to allow the passage of a gas flow and defined on the box-shaped body 311, wherein inside the box-shaped body 311 there are:
- filtering means 317, corresponding to the filtering means described above with reference to the other variant embodiments,
- a metering device 319 suited to measure one or more parameters for the determination of the gas flow rate;
- possibly but not necessarily, an on-off valve 318 suited to intercept the gas flow through the gas meter 310.

The box-shaped body 311 comprises two half-shells 311a and 311b welded together.

The two half-shells 311a and 311b are joined together at the level of perimeter joining edges facing each other, respectively indicated by 311c and 311d, as clearly visible in Figures from 8 to 10.

In said variant embodiment, the mechanical filtering partition 327 has perimeter edges 365 configured in such a way that they can be placed in contact with the inner surface of the box-shaped body 311 at the level of the area where the perimeter joining edges 311c and 311d of the half-shells 311a and 311b are joined, as clearly shown in FIG. 10.

In said variant embodiment, the sealing means comprise a glue bead 398.

Analogously to what has been described above, in said variant embodiment the gas meter structure 310 according to the invention comprises:
- an inlet duct 325 extending from said inlet mouth 315 towards an opposite side 313 of the box-shaped body 311,
- an outlet duct 340 extending from the outlet mouth 316 towards an opposite side 313 of the box-shaped body 311,
- with the metering device 319 positioned in an intermediate area between the inlet duct 325 and the outlet duct 340.

In said variant embodiment, the on-off valve 318 is positioned at the level of the inlet duct 325.

The on-off valve 318 is a part of the inlet duct 325.

The on-off valve 318 divides the inlet duct 325 in two sections, a first section 325c connecting the on-off valve to the dust deposit chamber 326 and a second section 325d connecting the same valve to the inlet mouth 315.

The on-off valve 18, 118 and 318 is to be understood as being a solenoid valve of the known type or another similar and equivalent on-off valve.

It has thus been ascertained that the invention achieves the set purpose and objects.

More specifically, the invention provides a gas meter structure 10 in which, thanks to the filtering means 17 comprising a dust deposit chamber 26 intended to hold back dust and defined between the bottom side 13 of the box-shaped body 11 and a mechanical filtering partition 27, the main gas flow transports the dust present in the gas flow neither towards the metering device 19 nor towards the on-off valve 18, when present and located at the level of the outlet mouth 16; in this way, the metering and functional performance of the valve is guaranteed and constant over time.

The filtering system is made up in such a way as to collect the dust in a space positioned on the bottom of the meter and perimetrically delimited by sealing edges that prevent the upward flow of gas that has not been filtered by the filtering outlet wall 28.

Furthermore, in our case, the sizing of the total surface area of the through openings of the filtering outlet wall 28 has been carried out trying to identify the optimal balance between the filtering action exerted on the particles and the minimization of the flow resistance intrinsic in the system, while in the known art the difference in pressure between the inlet and the outlet of the gas meter structure itself keeps increasing as a consequence of the accumulation of particles on the filter during the useful life of the gas meter structure.

Moreover, in the gas meter structure according to the present invention, the pressurized gas flow, once filtered by the through openings 28a, moves upwards towards the top of the box-shaped body 11, where there is the inlet opening 19a of the metering device 19 for the measurement of one or more parameters for the determination of the gas flow rate; this position, which is high with respect to the dust deposit chamber 26, is such that during the upward flow of the gas only the lighter particles reach the metering device 19, while the heavier granules fall towards the bottom of the meter structure due to gravity or adhere to its sides; in this way, the metering device 19 and even more obviously the on-off valve 18, when provided at the level of the outlet mouth 16, and which is the last element of the chain through which the gas flows before exiting from the gas meter structure 10, are protected against the fouling action of the gas.

Furthermore, the invention provides a gas meter structure 10 that is capable of eliminating the risks of fraud due to tampering with the metering device 19 from the outside, for example in the case where an attempt should be made to access the metering device through the connection elements using a tool designed to hinder the operation of the sensors present in the metering device.

The invention as conceived can be subjected to several changes and modifications, all falling within the inventive concept illustrated herein; furthermore, all the details and elements can be replaced by other technically equivalent details and elements.

In practice, any components and any materials can be used, provided that they are compatible with the intended use, and likewise any size and shape can be selected, according to the needs and the state of the art.

Where the characteristics and techniques mentioned in any of the claims are followed by reference signs, it must be understood that these reference signs are used only for the purpose of making the claims easier to understand, consequently these reference signs do not have any limiting effect on the function and meaning of any element identified by the same reference signs by way of example.

The invention claimed is:

1. A gas meter structure, comprising
   a box-shaped body;
   an inlet mouth and an outlet mouth suited to allow the passage of a gas flow and defined on said box-shaped body;
   wherein inside said box-shaped body there are:
   a metering device suited to measure one or more parameters for the determination of the gas flow rate;
   filtering means suited to filter the gas flow,
   said filtering means comprising a dust deposit chamber for the dust present in the gas flowing in, said dust deposit chamber comprising an inlet opening, which communicates with said inlet mouth of said box-shaped body, and a dust collection bottom,
   wherein said dust deposit chamber comprises a filtering outlet wall provided with through openings, said dust deposit chamber being configured in such a way that the gas flows into it through said inlet opening and flows out of it through said through openings of said filtering outlet wall, said filtering outlet wall being defined on a mechanical filtering partition,
   further comprising an inlet duct extending from said inlet mouth at least to said inlet opening of said dust deposit chamber,
   said inlet duct having a first end, to be considered as the lower end with respect to a normal configuration of use, and a second end, to be considered as the upper end,
   a passage space being defined between said first end and said dust collection bottom for the gas flowing out of said first end of said inlet duct itself,
   wherein said mechanical filtering partition develops according to a reference plane that lies crosswise with respect to the direction of extension of said inlet duct at the level of a section of said inlet duct that serves for connection to said inlet opening.

2. The gas meter structure according to claim 1, wherein said dust deposit chamber is defined between a bottom side of the box-shaped body and said mechanical filtering partition, said mechanical filtering partition being interposed between the bottom side and a top side of said box-shaped body.

3. The gas meter structure according to claim 2, wherein said mechanical filtering partition is interposed between said bottom side and an intercepting projection of said metering device.

4. The gas meter structure according to claim 1, wherein said mechanical filtering partition comprises said inlet opening of said dust deposit chamber.

5. The gas meter structure according to claim 1, wherein an outer perimeter of said mechanical filtering partition is shaped in such a way as to imitate an inner sectional outline of the box-shaped body, said outer perimeter being arranged in proximity to or in contact with an inner surface of said box-shaped body.

6. The gas meter structure according to claim 1, wherein sealing means are provided between the mechanical filtering partition and an inner surface of the box-shaped body, said sealing means being configured to prevent the gas from flowing between the dust deposit chamber and the rest of an inner space of the box-shaped body.

7. The gas meter structure according to claim 1, wherein said mechanical filtering partition is a part of a shaped body positioned inside the box-shaped body.

8. The gas meter structure according to claim 7, wherein said mechanical filtering partition is constituted by a flat portion extending from the shaped body, said flat portion being shaped in such a way as to imitate an inner sectional outline of the box-shaped body.

9. The gas meter structure according to claim 8, wherein said through openings of the filtering outlet wall are positioned on said flat portion between said inlet opening and said shaped body.

10. The gas meter structure according to claim 1, wherein dimensions of said through openings of the filtering outlet wall are such that they constitute an obstacle against the passage of dust.

11. The gas meter structure according to claim 1, wherein said passage space is configured to allow the gas to flow from said inlet duct to said dust collection bottom and from said dust collection bottom to said filtering outlet wall.

* * * * *